United States Patent
Lee et al.

(10) Patent No.: US 8,725,164 B2
(45) Date of Patent: May 13, 2014

(54) METHOD AND APPARATUS FOR REMINDING CALENDAR SCHEDULE AND RECORDING MEDIUM

(75) Inventors: Yu-Cheng Lee, Taoyuan County (TW); Kuang-Rong Lu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 616 days.

(21) Appl. No.: 12/534,865

(22) Filed: Aug. 4, 2009

(65) Prior Publication Data

US 2010/0048185 A1 Feb. 25, 2010

(30) Foreign Application Priority Data

Aug. 22, 2008 (TW) ............................... 97132246 A

(51) Int. Cl.
*H04W 24/00* (2009.01)
*H04M 3/42* (2006.01)
*G01C 21/00* (2006.01)

(52) U.S. Cl.
USPC ...................... 455/456.1; 455/414.1; 701/201

(58) Field of Classification Search
USPC .............................. 455/456.1, 414.1; 701/201
See application file for complete search history.

(56) References Cited

U.S. PATENT DOCUMENTS

| 7,139,722 | B2 | 11/2006 | Perrella et al. | |
| 2003/0146835 | A1* | 8/2003 | Carter | 340/539.13 |
| 2006/0189325 | A1* | 8/2006 | Kim et al. | 455/456.1 |
| 2007/0217372 | A1* | 9/2007 | Gorday et al. | 370/338 |
| 2008/0167800 | A1* | 7/2008 | Geelen et al. | 701/201 |
| 2009/0234659 | A1* | 9/2009 | Liao et al. | 705/1 |

FOREIGN PATENT DOCUMENTS

| CN | 101155358 | 4/2008 |
| TW | 200705304 | 2/2007 |
| TW | 200939145 | 9/2009 |

OTHER PUBLICATIONS

"First Office Action of China Counterpart Application", issued on Jan. 10, 2011, p. 1-p. 5.
"Office Action of Taiwan Counterpart Application", issued on Feb. 24, 2012, p. 1-p. 9.

\* cited by examiner

*Primary Examiner* — Kamran Afshar
*Assistant Examiner* — Omoniyi Obayanju
(74) *Attorney, Agent, or Firm* — Jianq Chyun IP Office

(57) ABSTRACT

A method and an apparatus for reminding a calendar schedule and a recording medium are provided. First, a schedule and a location of an event are set in a calendar, and first positioning information of the location is obtained. Then, second positioning information of a current location of a mobile device is obtained. Next, the current location is determining whether to be within a signal range of a signal source. Once the current location is within the signal range, the time for moving from the location with the second positioning information to the location with the first positioning information is calculated. Finally, a reminding time is set according to the transferring time, and a reminding action is taken at the reminding time. Thereby, the reminding time of the event can be dynamically adjusted to avoid delay caused when the mobile device is too far from the event location.

20 Claims, 3 Drawing Sheets

METHOD AND APPARATUS FOR REMINDING CALENDAR SCHEDULE AND RECORDING MEDIUM

CROSS-REFERENCE TO RELATED APPLICATION

This application claims the priority benefit of Taiwan application serial No. 97132246, filed on Aug. 22, 2008. The entirety of the above-mentioned patent application is hereby incorporated by reference herein and made a part of this specification.

BACKGROUND

The broad application of mobile devices has changed our life style gradually. For example, in the past, people used to write down notes of important events in calendars, while nowadays, people use electronic calendar function disposed in mobile devices (such as mobile phones and Personal Digital Assistances (PDAs)) to record those events. An electronic calendar provides a lot of convenience in event recording. By integrating the electronic calendar into a mobile device, a user can be reminded of his/her upcoming event. Thus, nowadays, many businessmen use the electronic calendar function provided by mobile devices to record various events, such as visiting customers, delivering goods, dating, and business trips, etc.

An important function of an electronic calendar is providing a reminding message to a user when the schedule of a stored event is due. The user may also set the reminding message to an earlier time (for example, 10 minutes earlier) so that the calendar can provide the reminding message at the set earlier time to remind the user in advance. However, even though the user can be reminded of an event through the method described above, the time it takes for the user to reach the event location is not considered. As a result, the user may be late for the event or even miss it. For example, if a user is visiting a customer at Taoyuan County and the calendar reminds the user that there will be a conference at Taipei 10 minutes later, the user will definitely be late for or even miss the event due to the long distance between the two places.

SUMMARY

Accordingly, the present application is directed to a method for reminding a calendar schedule, in which a reminding message is provided in advance to a user according to the distance between the location of the user and the location of an event, so that the user will not be late for the event when the user is very far from the event location.

The present application is directed to an apparatus for reminding a calendar schedule, in which the location of a user is detected in real time by using a positioning module, and the time required by the user for moving to the location of an event is calculated such that a reminding time of the calendar schedule can be dynamically adjusted.

The present application provides a recording medium, in which the recording medium can be loaded into an electronic device and executed by the same to perform a reminding action of an event in advance.

The present application provides a method for reminding a calendar schedule, in which the method is suitable for a mobile device. The method comprises following steps. First, a schedule and a location of an event are set in a calendar, and first positioning information of the location is obtained. Then, second positioning information of a current location of the mobile device is obtained. Next, the current location is determined whether to be within a signal range of a signal source which provides services at the event location. Once the current location is within the signal range, a transferring time for moving from the location with the second positioning information to the location with the first positioning information is calculated. Finally, a reminding time of the event is set according to the transferring time, and a reminding action of the event is performed at the reminding time, wherein the reminding time is earlier than the schedule for a length of the transferring time and a predetermined time.

According to an example of the present application, the second positioning information may be obtained through the positioning of a positioning module, and the first positioning information may also be obtained through the positioning of the positioning module or by inquiring an electronic map or a positioning information database, in which the electronic map and the positioning information database contain positioning information of a plurality of locations.

According to an example of the present application, the step of calculating the transferring time for moving from the location with the second positioning information to the location with the first positioning information comprises calculating the transferring time for moving from the second positioning information to the first positioning information by referring to road speed limit information in the electronic map.

According to an example of the present application, in the step of calculating the transferring time for moving from the location with the second positioning information to the location with the first positioning information by referring to the road speed limit information in the electronic map, a path for moving from the location with the second positioning information to the location with the first positioning information is planed by referring to the electronic map, and then the transferring time for moving from the location with the second positioning information to the location with the first positioning information is calculated by referring to road speed limit information of one or multiple roads passed through by the path in the electronic map.

According to an example of the present application, in the step of calculating the transferring time for moving from the location with the second positioning information to the location with the first positioning information by referring to the road speed limit information in the electronic map, a distance between the location with the second positioning information and the location with the first positioning information is calculated, and the distance is divided by the road speed limit information to obtain the transferring time.

According to an example of the present application, before the step of obtaining the second positioning information of the current location of the mobile device, the method further comprises setting a turn-on time for turning on the mobile device to obtain the second positioning information of the current location of the mobile device and turning on the mobile device to obtain the second positioning information of the current location of the mobile device at the turn-on time, in which the turn-on time is a time earlier than the schedule of the event for a fixed length of time or is a specific time set by a user.

According to an example of the present application, the reminding action comprises broadcasting or displaying a reminding message of the event.

The present application provides an apparatus for reminding a calendar schedule. The apparatus comprises a calendar module, a positioning module, a calculation unit, and a reminding module. The calendar module sets a schedule and a location of an event and obtains first positioning information of the location. The positioning module obtains second positioning information of a current location and determines whether the current location is within a signal range of a signal source which provides services at the event location. The calculation unit calculates a transferring time for moving from the location with the second positioning information to the location with the first positioning information when the positioning module determines the current location exceeds the signal range of the signal source and sets a reminding time of the event according to the transferring time, wherein the reminding time is earlier than the schedule for a length of the transferring time and a predetermined time. The reminding module performs a reminding action of the event at the reminding time.

According to an example of the present application, the apparatus further comprises a storage unit for storing an electronic map or a positioning information database, in which the electronic map and the positioning information database contain positioning information of a plurality of locations.

According to an example of the present application, the calculation unit calculates the transferring time for moving from the location with the second positioning information to the location with the first positioning information by referring to road speed limit information in the electronic map.

According to an example of the present application, the apparatus further comprises a navigation module which plans a path for moving from the location with the second positioning information to the location with the first positioning information by referring to the electronic map, in which the calculation unit calculates the transferring time for moving from the location with the second positioning information to the location with the first positioning information by referring to road speed limit information of one or multiple roads passed through by the path in the electronic map.

According to an example of the present application, the calculation unit calculates a distance between the location with the second positioning information and the location with the first positioning information and divides the distance by the road speed limit information to obtain the transferring time.

According to an example of the present application, the reminding module further sets a turn-on time for turning on the positioning module to obtain the second positioning information of the current location and turns on the positioning module to obtain the second positioning information of the current location at the turn-on time, in which the turn-on time is a time earlier than the schedule of the event for a fixed length of time or is a specific time set by a user.

According to an example of the present application, the positioning module may be a global positioning system (GPS) or a device using a base station of the global system for mobile communication (GSM) system, the personal handyphone system (PHS), or the code division multiple access (CDMA) system, a wireless fidelity (Wi-Fi) hotspot, a radio repeater, or a radio broadcaster for positioning.

According to an example of the present application, the apparatus is disposed in a mobile device, in which the mobile device is a mobile communication device, such as a mobile phone, a smart phone, a personal digital assistant (PDA), or a PDA phone; a navigation device; a notebook; a car PC; or a media player.

The present application provides a recording medium which records program instructions to be loaded into a mobile device to execute following steps. First, a schedule and a location of an event are set in a calendar, and first positioning information of the location is obtained. Then, second positioning information of a current location of the mobile device is obtained. Next, a transferring time for moving from the location with the second positioning information to the location with the first positioning information is calculated. Eventually, a reminding time of the event is set according to the transferring time, and a reminding action of the event is performed at the reminding time.

In the present application, a positioning module is integrated with an electronic calendar for obtaining the location of a user in real time, and the time for the user to reach the location of an event is determined by referring to the schedule and the event location in the electronic calendar. Accordingly, a reminding message can be provided to the user in advance so that the user will not be late for the event even if the user is very far from the event location.

BRIEF DESCRIPTION OF THE DRAWINGS

The accompanying drawings are comprised to provide a further understanding of the application, and are incorporated in and constitute a part of this specification. The drawings illustrate examples of the application and, together with the description, serve to explain the principles of the application.

DESCRIPTION

Reference will now be made in detail to the present examples of the application, examples of which are illustrated in the accompanying drawings.

By setting a calendar, a user can be reminded in advance to set off for the location of an event. However, the reminding time has to be brought earlier if the user is very far from the event location. According to the present application, the location of the user is detected in real time by a positioning module disposed in the mobile device, and the reminding time of the event is dynamically adjusted so that the user can be reminded in advance and have enough time to reach the event location. The present application provides a method and an apparatus for reminding a calendar schedule and a recording medium using the method based on the concept described above. Examples of the present application will be described below with reference to accompanying drawings.

Figure 1:
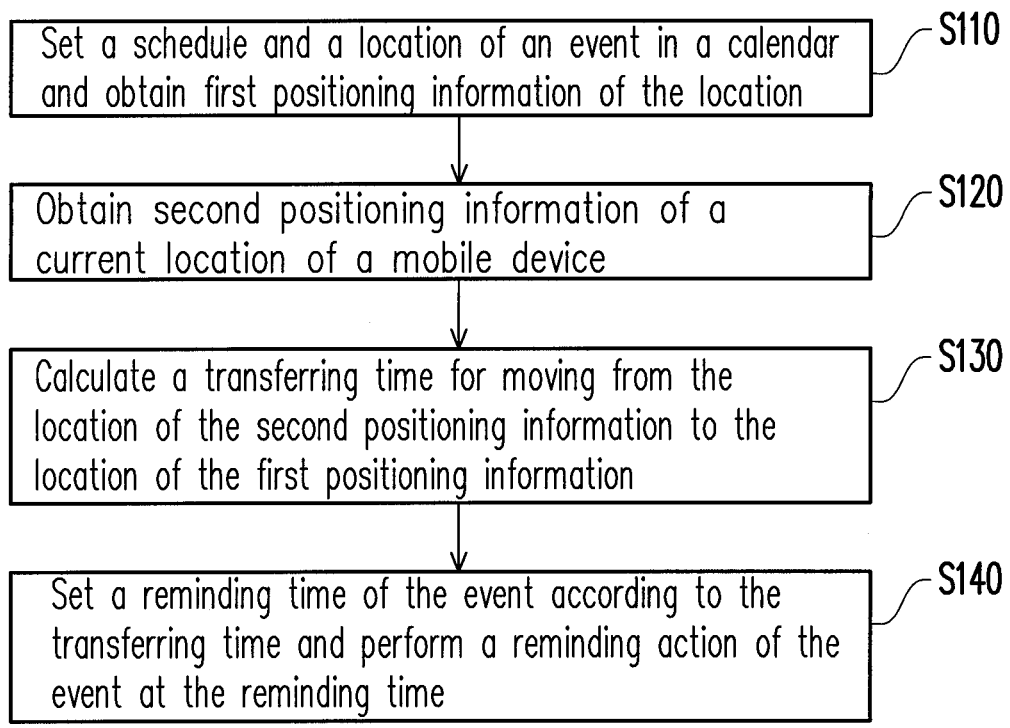
FIG. 1 is a flowchart of a method for reminding a calendar schedule according to an example of the present application.

FIG. 1 is a flowchart of a method for reminding a calendar schedule according to an example of the present application. Referring to FIG. 1, the method in the present example is suitable for a mobile device with an electronic calendar and a positioning function. The mobile device may be a mobile communication device, such as a mobile phone, a smart phone, a personal digital assistant (PDA), or a PDA phone; a navigation device; a notebook; a car PC; or a media player; however, the scope of the mobile device is not limited in the present application.

First, a schedule and a location of an event are set in the calendar of the mobile device, and first positioning information of the location is obtained (step S110). The event may be a conference, a class, a meeting; a date, or something the user needs to do, for example, and besides the content and schedule of the event, the event location is further stored in the calendar, such as the address, city, building, conference room of a conference. The mobile device can obtain positioning information of the location through the positioning module or by inquiring an electronic map or a positioning information database; however, the method for obtaining the positioning information is not limited in the present example.

To be specific, the positioning module may be a global positioning system (GPS) or a device using the Global System for Mobile Communication (GSM), the Personal Handyphone System (PHS), the Code Division Multiple Access (CDMA) system, an access point of a wireless fidelity (Wi-Fi) hotspot, a radio repeater, or a radio broadcaster for positioning. When the user set an event, if the user is at the same location of the event (for example, in the same building), positioning information of the event location can be obtained instantly through the positioning module and use the current location of the mobile device as the positioning information of the event location.

On the other hand, if the user is at a location different from the event location when the user sets the event, the positioning information of the event location can be obtained by inquiring an electronic map or a positioning information database. The electronic map and the positioning information database comprise the positioning information of a plurality of locations. These locations may be general points of interest (POI) in an electronic map or may also be locations set by the user, and the positioning information comprises (but is not limited to) addresses, roads, blocks, buildings, or site names, etc. Besides, the user may also select or pick a specific location in the electronic map as the event location, and the electronic map can convert such information into the positioning information and store it into the calendar.

To obtain the positioning information of the event location by inquiring the electronic map, the address, road, block, building, or name of POI entered by the user when the user sets the event location is compared with the positioning information stored in the electronic map. The same method is able to applied to the positioning information database inquiring, in which the positioning information database contains positioning information such as (but is not limited to) POIs, blocks, addresses, buildings, or site names, etc. The positioning information of the event location can also be obtained by comparing the positioning information stored in the positioning information database. Furthermore, the user may select or pick the event location in the electronic map and then store it in the electronic may or positioning information database, so that the added event location may used for positioning information comparing in the future. The electronic map and the positioning information database may be stored in the mobile device or in an external server. The mobile device can obtain the desired positioning information by querying the server.

After the event is set in the calendar, the mobile device constantly detects the location of the user through the positioning module to obtain second positioning information of the current location of the user (step S120). Besides positioning the user through a global positioning system (GPS), the mobile device may also position the user through a base station provided by a communication service provider or through a nearby wireless fidelity (Wi-Fi) hotspot (access point). The foregoing positioning methods require only very low power consumption therefore allow the mobile device to detect the location of the user for a long time.

In another example of the present application, after the event is set in the calendar, the user can set a time for the mobile device to start detecting the current location of the mobile device through the positioning module according to the user's own situation, so as to obtain the second positioning information of the current location. For example, the user may set that the positioning module is only turned in a period of time (for example, 6 hours) before the event starts or at a specific time. The power consumed by the positioning module can be reduced through the method described above.

After that, the mobile device calculates a transferring time for moving from the location with the second positioning information to the location with the first positioning information (step S130). In other words, the mobile device calculates the time required by the user to reach the event location from the user's current location, and the transferring time may be calculated by referring to road speed limit information in the electronic map or position information database.

To be specific, the speed limit information of each road is stored in the electronic map or position information database. When the mobile device calculates the transferring time, the mobile device first plans a path for moving from the location with the second positioning information to the location with the first positioning information through a navigation software in the mobile device or in an external server and then calculates the transferring time for moving from the location with the second positioning information to the location with the first positioning information by referring to the road speed limit information of one or multiple roads passed through by the path in the electronic map.

It should be mentioned that if there is no navigation software or the distance between the location with the first positioning information and the location with the second positioning information is short, the mobile device can directly calculate the distance between the location with the first positioning information and the location with the second positioning information, and then divide the distance by the road speed limit information (for example, a road average speed limit information stored in the electronic map or position information database) or walking pace (for example, 5-7 km/hr) to obtain the transferring time; however, the present application is not limited to the calculation methods described above.

It should be mentioned that even though in the examples described above, the transferring time for moving from the location with the second positioning information to the location with the first positioning information is calculated by using the distance (for example, the road distance or straight distance) between the location with the first positioning information and the location with the second positioning information and a speed limit information (for example, road speed limit information or an average speed limit information) or walking pace, the present application is not limited thereto, and any method which can calculate the transferring time for moving from the location with the second positioning information to the location with the first positioning information can be applied to the present application.

Finally, the mobile device sets a reminding time of the event according to the transferring time and performs a reminding action of the event at the reminding time (step S140). The reminding action may be giving out a reminding sound, playing an audio message, or displaying a reminding message in the mobile device; however, the scope of the reminding action is not limited in the present application. It should be noted herein that the reminding time is a time earlier than the schedule of the event for the length of the transferring time or for the length of the transferring time plus a predetermined time, in which the predetermined time can be set by the mobile device or by the user when the user sets the event; however, the present application is not limited thereto.

Figure 2:
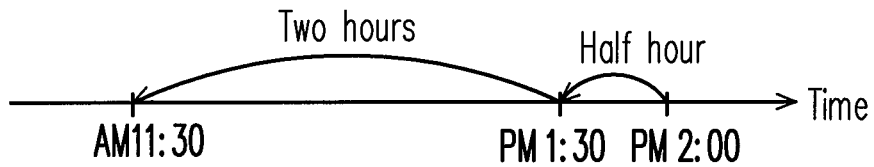
FIG. 2 illustrates an example of how to calculate a reminding time according to an example of the present application.

FIG. 2 illustrates an example of how to calculate a reminding time according to an example of the present application.

Referring to FIG. 2, assuming that a conference is scheduled at 2:00 pm by a user, the calendar or the user then advances the reminding time of the conference for a period of time (for example, half an hour), and accordingly the reminding message should be provided at 1:30 pm. Next, the transferring time of the user is calculated through the method described above to be 2 hours, and then the calendar sets the reminding time to be 2 hours earlier than the preset reminding time, namely, the reminding message is provided to the user at 11:30 am.

Through the method described above for dynamically adjusting the reminding time, the user can receive the reminding message at the time that can make the user to arrive at the event on time regardless of the location thereof. It should be mentioned that in the present application, in order to reduce the power consumption of the positioning module, whether the user is around the event location is further determined to decide whether to advance the reminding time. This will be described below with reference to an example of the present application.

Figure 3:
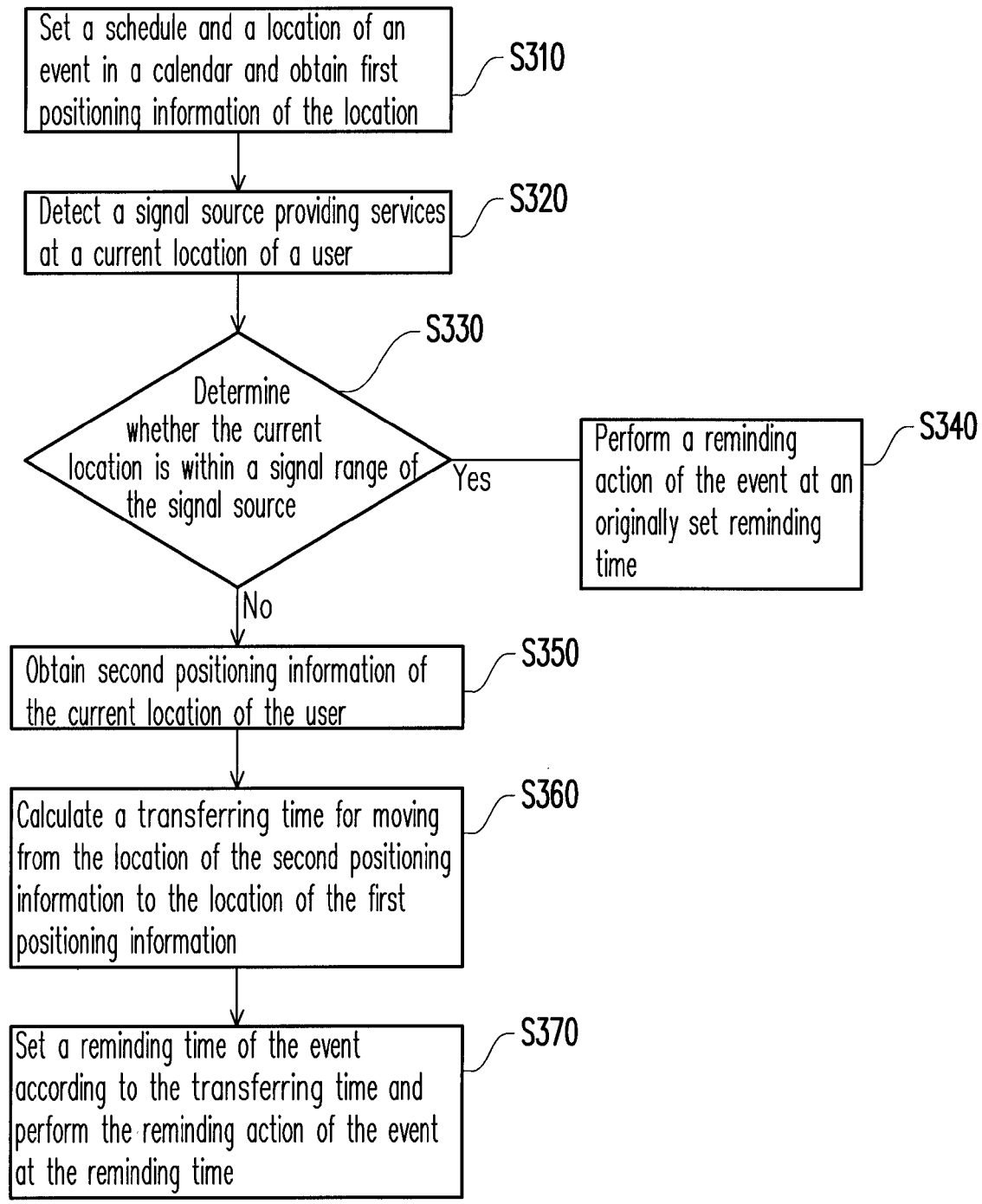
FIG. 3 is a flowchart of a method for reminding a calendar schedule according to an example of the present application.

FIG. 3 is a flowchart of a method for reminding a calendar schedule according to an example of the present application. Referring to FIG. 3, the method in the present example is suitable for a mobile device with an electronic calendar and a positioning function. The mobile device is, for example, a mobile communication device, such as a mobile phone, a smart phone, a personal digital assistant (PDA), or a PDA phone; a navigation device; a notebook; a car PC; or a media player; however, the scope of the mobile device is not limited in the present application.

Similarly, in the present example, a schedule and a location of an event are set in a calendar of the mobile device, and first positioning information of the location is obtained (step S310).

Then, the mobile device detects a signal source for providing service at a current location of the user (step S320) and determines whether the current location is within a signal range of the signal source (step S330). For example, the user can identify whether a base station which provides services at the location of the user is the same base station for providing services at the event location by using an identification code received from the base station.

If it is determined in step S330 that the current location is still within the signal range of the signal source which provides services at the event location, the reminding action of the event is performed at the originally set reminding time (step S340), and the transferring time is not calculated to advance the reminding time through the method provided by the present application. In short, the mobile device determines whether the user is close to the event location based on whether the user is within the signal range of the base station which provides services at the event location. If the user is around the base station for providing services at the event location, it can be determined that the user is not far from the event location (for example, in the same building) and can reach the event location within the predetermined time, so that it is not necessary to detect the positioning information or calculate the transferring time. Since detecting the signal of a base station is only a routine work carried out in the standby state by each mobile phone, the power consumption of the mobile phone won't be increased. Thereby, the flexibility in using the reminding method provided by the present application is increased by adopting the method described above.

Contrarily, if it is determined that the current location is out of the signal range of the signal source for providing services at the event location, the current location of the user is further detected through the positioning module so as to obtain second positioning information of the current location (step S150). After that, a transferring time required for moving from the location with the second positioning information to the location with the first positioning information is calculated (step S160). Next, the reminding time of the event is set according to the transferring time, and a reminding action of the event is performed at the reminding time (step S170). The contents of steps S350~S370 are the same as or similar to those of the steps S120~S140 described in foregoing example such that the detail will not be described herein.

The present application also provides a reminding apparatus corresponding to the reminding method described above. The apparatus is suitable for being disposed in a mobile device, such as a mobile phone, a smart phone, a personal digital assistant (PDA), or a PDA phone; a navigation device; a notebook; a car PC; or a media player, carried by a user and reminding the user to set off in advance for an event. Below, the reminding apparatus in the present application will be described in detail with reference to an example of the present application.

Figure 4:
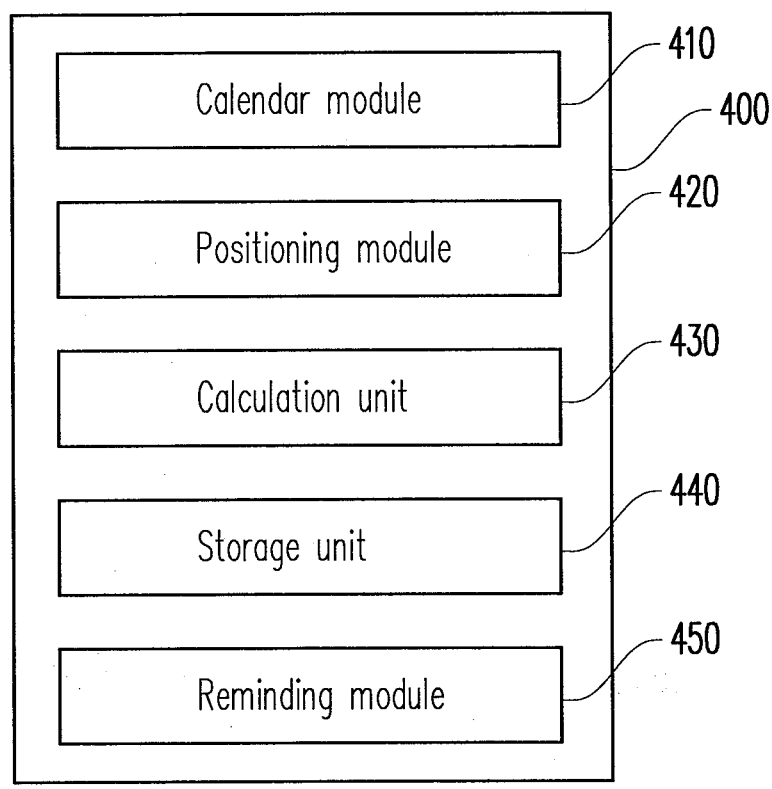
FIG. 4 is a block diagram of an apparatus for reminding a calendar schedule according to an example of the present application.

FIG. 4 is a block diagram of an apparatus for reminding a calendar schedule according to an example of the present application. Referring to FIG. 4, in the present example, the reminding apparatus 400 comprises a calendar module 410, a positioning module 420, a calculation unit 430, a storage unit 440, and a reminding module 450. The functions of foregoing components will be respectively described below.

The calendar module 410 sets a schedule and a location of an event and obtains first positioning information of the location. The positioning module 420 positions the reminding apparatus 400 to obtain second positioning information of the current location of the reminding apparatus 400. The positioning module 420 may be a GPS or a device using a base station of the GSM, PHS, or CDMA system, or a Wi-Fi hotspot for positioning.

The calculation unit 430 may be a microprocessor. The calculation unit 430 calculates a transferring time for moving from the location with the second positioning information to the location with the first positioning information and sets a reminding time of the event according to the transferring time. The calculation unit 430 accesses an electronic map or a positioning information database stored in the storage unit 440 to obtain the first positioning information of the event location. In addition, the calculation unit 430 can calculate the transferring time for moving from the location with the second positioning information to the location with the first positioning information by inquiring the road speed limit information stored in the electronic map.

To be specific, the electronic map records the speed limit information of each road, and when the mobile device calculates the transferring time, it first plans a path for moving from the location with the second positioning information to the location with the first positioning information through a navigation module (not shown) by referring to the electronic map and then calculates the transferring time for moving from the location with the second positioning information to the location with the first positioning information by referring to the road speed limit information of one or multiple roads passed through by the path in the electronic map. In another example, the transferring time may be calculated based on the walking path.

On the other hand, if there is no navigation module, the calculation unit 430 can directly calculate the straight distance between the location with the first positioning information and the location with the second positioning information and then divide the straight distance by an average speed limit information stored in the electronic map or the average walking path to obtain the transferring time; however, the present application is not limited thereto.

The reminding module 450 executes a reminding action of the event at the reminding time provided by the calculation unit 430. The reminding action may be giving out a reminding sound, playing an audio message, or displaying a reminding message in the mobile device.

It should be mentioned that the electronic map and the positioning information database stored in the storage unit 440 contain the positioning information of a plurality of locations, in which these locations may be POIs or other locations specified by the user, and the positioning information comprises (but is not limited to) addresses, roads, blocks, buildings, or site names, etc. Thus, the calendar module 410 can obtain the positioning information of the event location set by the user by inquiring the electronic map or positioning information database according to the event location or through the positioning of the positioning module 420. The method for obtaining the positioning information of the event location has been described in foregoing examples such that the detail will not be described herein.

On the other hand, in order to reduce the power consumption of the reminding apparatus 400, the positioning module 420 further determines whether the current location is within a signal range of a signal source that provides services at the event location, and the calculation unit 430 only calculates the transferring time and adds it to the reminding time when it is determined that the current location exceeds the signal range of the signal source.

The present application further provides a recording medium which records a computer program to be loaded into a mobile device to execute the calendar schedule reminding method described above. The computer program is composed of a plurality of program segments (for example, an organization chart establishing program segment, an approval form program segment, a setting program segments, and a deployment program segment). The program segments are loaded into the mobile device and executed by the same to accomplish the calendar schedule reminding method and the functions of the calendar schedule reminding apparatus described above.

As described above, the present application provides a method and an apparatus for reminding a calendar schedule and a recording medium, in which a positioning function is integrated with a calendar such that when a user is far from the location of an event, the positioning module is automatically turned on to detect the positioning information of the user when the current location of the user exceeds a signal range of a signal source, and the distance between the user and the event location is taken into consideration for calculating a reminding time. Thereby, the power for detecting the positioning information of the user can be saved and the user can be reminded in advance and set off for the event on time. Accordingly, the reminding time of an event can be dynamically adjusted so that the user will not be late for the event due to the long distance between the user and the event location.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for reminding a calendar schedule, suitable for a mobile device, the method comprising:

setting a schedule and a location of an event in a calendar, and obtaining first positioning information of the location by using the mobile device;

setting a first reminding time of the event in the calendar;

obtaining second positioning information of a current location of the mobile device;

determining whether to advance the first reminding time based on whether the mobile device is within a signal range of a signal source which provides a connection service for the mobile device at the location, wherein the signal source is either a wireless base station or a Wi-Fi access point; and when determined by the mobile device that the current location exceeds the signal range of the signal source:
calculating a transferring time of moving from the current location with the second positioning information to the location of the event with the first positioning information;
advancing from the first reminding time to a second reminding time which is earlier than the first reminding time by subtracting the transferring time from the first reminding time to generate the second reminding time; and
performing a reminding action of the event at the second reminding time.

2. The method according to claim 1, wherein the second positioning information is obtained through positioning of a positioning module.

3. The method according to claim 1, wherein the location of the event is set by selecting or picking a specific location in an electronic map.

4. The method according to claim 1, wherein the first positioning information is obtained by inquiring an electronic map according to the location, wherein the electronic map comprises positioning information of a plurality of locations.

5. The method according to claim 1, wherein the first positioning information is obtained by inquiring a positioning information database according to the location, wherein the positioning information database comprises positioning information of a plurality of locations.

6. The method according to claim 1, wherein the step of calculating the transferring time for moving from the location with the second positioning information to the location with the first positioning information comprises:
calculating the transferring time for moving from the location with the second positioning information to the location with the first positioning information by referring to road speed limit information in an electronic map or a position information database or by referring to walking pace.

7. The method according to claim 6, wherein the step of calculating the transferring time for moving from the location with the second positioning information to the location with the first positioning information by referring to the road speed limit information in the electronic map comprises:
calculating a distance between the location with the second positioning information and the location with the first positioning information; and
dividing the distance by the road speed limit information or walking pass to obtain the transferring time.

8. The method according to claim 1, wherein the step of calculating the transferring time for moving from the location with the second positioning information to the location with the first positioning information comprises:
planning a path for moving from the location with the second positioning information to the location with the first positioning information; and calculating the transferring time for moving from the location with the second positioning information to the location with the first positioning information by referring to road speed limit information of one or multiple roads which are passed through by the path.

9. The method according to claim 1, wherein before the step of obtaining the second positioning information of the current location of the mobile device, the method further comprises:
setting a turn-on time for turning on the mobile device to obtain the second positioning information of the current location of the mobile device, and turning on the mobile device to obtain the second positioning information of the current location of the mobile device at the turn-on time, wherein the turn-on time is a time earlier than the schedule of the event for a fixed length of time or is a specific time set by a user.

10. The method according to claim 1, wherein the reminding action comprises broadcasting or displaying a reminding message of the event.

11. An apparatus for reminding a calendar schedule, comprising:
a calendar module, for setting a schedule and a location of an event, setting a first reminding time of the event in the calendar, and obtaining first positioning information of the location of the event;
a positioning module, for obtaining second positioning information of a current location and determining whether to advance the first reminding time based on whether the current location is within a signal range of a signal source which provides a connection service for the apparatus at the event location, wherein the signal source is either a base station or a Wi-Fi access point;
a calculation unit, for calculating a transferring time of moving from the current location with the second positioning information to the location of the event with the first positioning information and advancing from the first reminding time to a second reminding time which is earlier than the first reminding time by subtracting the transferring time from the first reminding time to generate the second reminding time when the positioning module determines that the current location exceeds the signal range of the signal source at the event; and
a reminding module, for performing a reminding action of the event at the second reminding time when the positioning module determines that the current location exceeds the signal range of the signal source at the event.

12. The apparatus according to claim 11, wherein the second positioning information is obtained through positioning of the positioning module.

13. The apparatus according to claim 11, wherein the location of the event is set by selecting or picking a specific location in an electronic map.

14. The apparatus according to claim 11, further comprising:
a storage unit, for storing an electronic map or a positioning information database, wherein the electronic map and the positioning information database comprise positioning information of a plurality of locations,
wherein the first positioning information is obtained by inquiring the Electronic map or the positioning information database.

15. The apparatus according to claim 11, further comprising:
a storage unit, for storing an electronic map or a positioning information database, wherein the electronic map and the positioning information database comprise positioning information of a plurality of locations,
wherein the calculation unit calculates the transferring time for moving from the location with the second positioning information to the location with the first positioning information by referring to road speed limit information in the electronic map or the positioning information database or by referring to walking pass.

16. The apparatus according to claim 11 further comprising:
a navigation module, for planning a path for moving from the location with the second positioning information to the location with the first positioning information, wherein the calculation unit calculates the transferring time for moving from the location with the second positioning information to the location with the first positioning information by referring to road speed limit information of one or multiple roads which are passed through by the path.

17. The apparatus according to claim 11, further comprising:
a storage unit, for storing an electronic map or a positioning information database, wherein the electronic map and the positioning information database comprise positioning information of a plurality of locations,
wherein the calculation unit calculates a distance between the location with the second positioning information and the location with the first positioning information and divides the distance by the road speed limit information or walking path to obtain the transferring time.

18. The apparatus according to claim 11, wherein the reminding module further sets a turn-on time for turning on the positioning module to obtain the second positioning information of the current location of the positioning module and turns on the positioning module to obtain the second positioning information of the current location of the positioning module at the turn-on time.

19. A non-transitory storage medium for storing computer readable codes to be loaded into a mobile device to execute functions comprising:
setting a schedule and a location of an event in a calendar, and obtaining first positioning information of the location by using the mobile device;
setting a first reminding time of the event in the calendar;
obtaining second positioning information of a current location of the mobile device:
determining whether to advance the first reminding time based on whether the mobile device is within a signal range of a signal source which provides a connection service for the mobile device at the location, wherein the signal source is either a wireless base station or a Wi-Fi access point; and
when determined by the mobile device tat the current location exceeds the signal range of the signal source:
calculating a transferring time of moving from the current location with the second positioning information to the location of the event with the first positioning information;
advancing from the first reminding time to a second reminding time which is earlier than the first reminding time by subtracting the transferring time from the first reminding time to generate the second reminding time; and
performing a reminding action of the event at the second reminding time.

20. The method of claim 1, wherein the first reminding time is the event time subtracted by a predetermined time.

* * * * *